Dec. 29, 1953　　　　E. H. EICHLER　　　　2,664,358
CANNING WHOLE FOOD ARTICLES
Filed Jan. 26, 1951
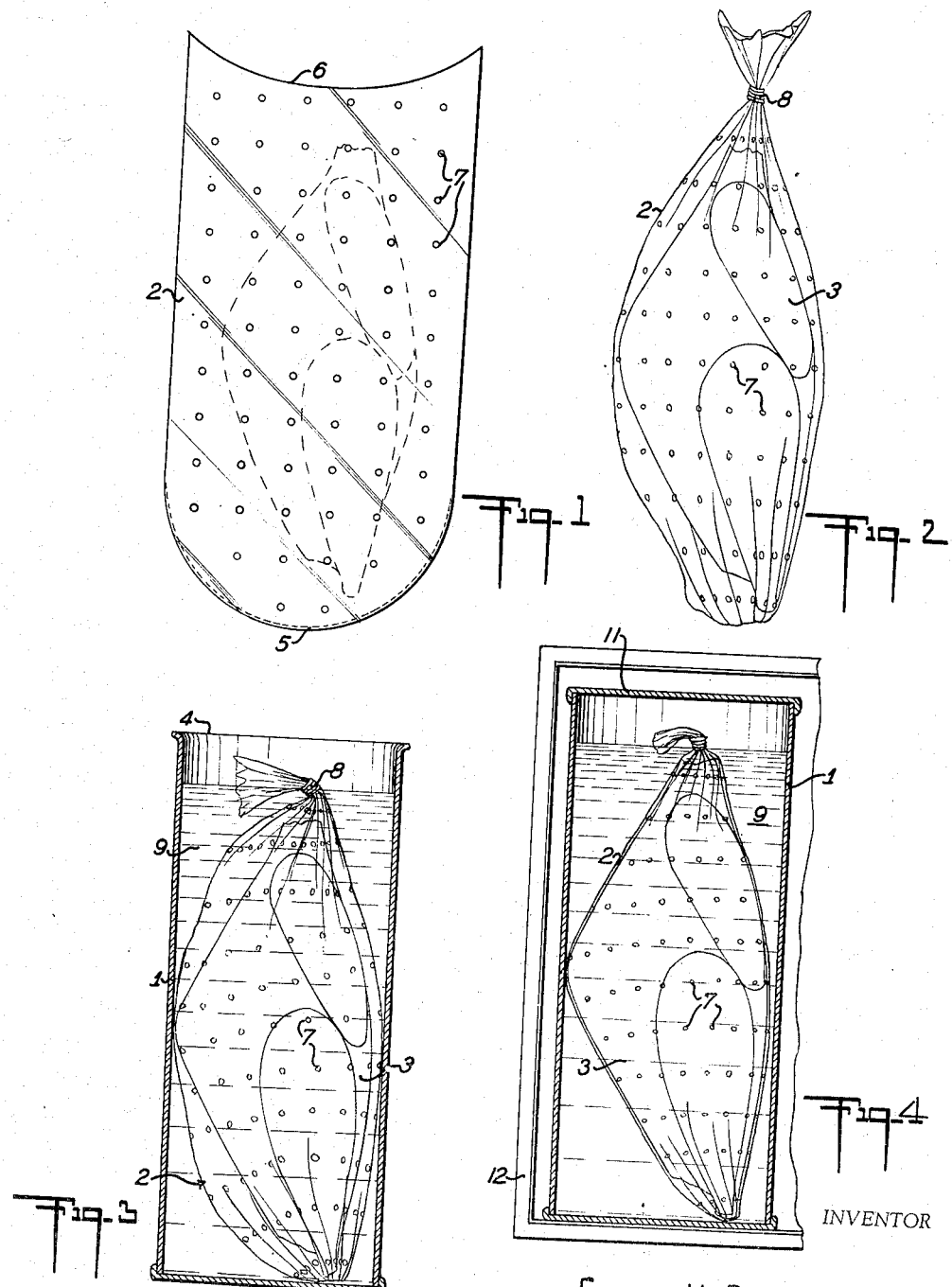
INVENTOR
EDWIN H. EICHLER
BY
ATTORNEY Patented Dec. 29, 1953

2,664,358

UNITED STATES PATENT OFFICE 2,664,358

CANNING WHOLE FOOD ARTICLES

Edwin H. Eichler, Dundee, Ill.

Application January 26, 1951, Serial No. 207,991

5 Claims. (Cl. 99—187)

1

The present invention relates to food containers and canning methods and more particularly to a food container for and method of canning whole food articles such as fowl.

Heretofore when whole food articles such as fowl have been canned difficulty has been experienced because the container or can, itself, has generally been cylindrical in shape while the contour of a whole fowl for instance is quite irregular and far from being cylindrical. Because of this disparity in shape, the can only supports the article at a few points of contact and the bulk of its meat is left to hang together in its natural form. The heat attending the canning process and the effect of the liquid in which this type of article is usually packed generally cause the article to fall apart or in the case of a fowl, cause the meat to fall off the bone and collect in the bottom of the container.

It is an object of the present invention in a container for whole food articles, such as fowl, comprising a somewhat rigid hermetically sealable protective outer enclosure, such as a can, to provide inner enclosing means which will fit the shape of said article to prevent it from falling apart and at the same time allow liquid carried in the outer enclosure to contact the article.

It is also an object of the invention in a container as described immediately hereinbefore, to provide an inner enclosing means or envelope which is heat shrinkable and perforated, so that during the canning process the envelope will shrink under heat to fit tightly around the article to hold it together and the perforations in the envelope will allow liquid carried in the outer enclosure to contact the article.

It is a further object of the invention to provide such an envelope in the form of a heat shrinkable perforated plastic bag.

It is a still further object of the invention to provide a method of canning generally comprising placing a whole food article inside a perforated heat shrinkable envelope, hermetically sealing said envelope inside an outer enclosure, such as a can, containing a liquid, and subjecting said enclosure and contents to heat so as kill bacteria and cause said envelope to shrink on said article to hold it together and allow the liquid in said enclosure to contact said article through the perforations in said envelope.

A still further object of the invention is the provision of a container which can be simply and inexpensively manufactured and a method of canning which is simple and inexpensive, both of which accomplish the above objects.

Other and further objects of the invention will be apparent from the following description and claims taken together with the drawings wherein:

Figure 1 is a view in elevation of a perforated envelope or bag of this invention.

Figure 2 is a view in elevation of the envelope or bag of Figure 1 after a whole fowl has been placed inside the bag and the mouth of the bag closed.

Figure 3 is a view partly in elevation and partly in section showing the perforated bag and fowl of Figure 2 in place inside an enclosure or can partly filled with a liquid.

Figure 4 is a view partly in elevation and partly in section showing the can and contents of Figure 3 in place in an oven or retort and after the can has been sealed and the can and contents heated in the oven.

Referring more particularly to the drawings, the numeral 1 designates an outer enclosure or can adapted to be hermetically sealed, and the numeral 2 an inner heat shrinkable envelope or bag adapted to hold a whole food article 3 and fit inside the can 1.

The enclosure 1 is shown as a conventional food containing metal can adapted to be hermetically sealed and having an opening 4 at one end for access during the canning operation. Of course this enclosure may be of any other suitable material, as for example, a large glass jar for use with certain types of food articles.

The envelope or bag 2 is relatively thin and must be of a material capable of shrinking appreciably under the heat of the canning process to fit fairly tightly around the food article 3. This material must be capable of retaining its strength and resisting decomposition due to canning heat, and capable of resisting the chemical action of the canning process and of various foods which may be canned. I have found that a substantially transparent heat shrinkable and resistant plastic is quite suitable for this purpose.

Figure 1 shows a flattened envelope or bag 2 closed at the bottom 5 and open at its top 6. This bag has a multiplicity of relatively small perforations 7 which may be of any shape but are preferably round holes as these are less apt to cause tear in the bag and are simple to make. As shown in Figures 1, 2 and 3, prior to heating, the envelope or bag 2 is appreciably larger than the food article 3 to allow for shrinkage of the bag when heat is applied and to make it easy to insert the article 3 into the bag.

In canning, the food article or fowl 3 is preferably first placed in the bag 2 and the bag closed as at 8 by any suitable means such as a clamp, tie or heat seal, generally as shown in Figure 2. The bag with its contents is then placed into the can 1 through the opening 4. Preferably the liquid 9 is then poured into the can to substantially cover the food article 3. Of course, for a known size food article, the liquid may be placed in the can before the bag 2 and article 3 are inserted therein, and in certain situations the liquid and bag could be in place in the can and the food article then placed into the bag and can and the bag closed through the opening 4 in the can.

At this point the liquid 9 enters the bag 2 through the perforations 7 and is in full contact with the food article 3. This liquid may be water or a previously prepared broth which may contain flavoring for the food.

When the food article 3, the envelope or bag 2, and the liquid 9 are in place in the enclosure or can 1, as shown in Figure 3, a cap 11 is placed over the opening 4 and the can sealed in a conventional manner, such as by a vacuum sealing, or an "exhaust box" standard sealing process. The sealed can is then placed in an oven or retort 12 and heat is applied for the dual purpose of killing bacteria, or sterilizing the interior of the can, and shrinking the envelope or bag 2 tightly around the food article or fowl 3. Depending upon the size of the can and food article and the character of the food, I have found that this combined sterilizing and shrinking operation can be readily accomplished by heating the can and its contents for from sixty to ninety minutes at temperatures ranging from 240 to 250 degrees Fahrenheit. The sealed can 1 is shown in Figure 4 after heat has been applied to sterilize the can and contents and shrink the bag 2 around the food article 3, so that the bag will hold the article together and prevent it from falling apart during the heating operation and afterwards when the article is packaged in the liquid 9.

During the heating operation the liquid 9 is in contact with the food article 3 so that the natural juices from the article will enter the liquid to form a broth and the liquid will maintain the article moist and may flavor the article if the liquid carries any flavoring. After the canning process is completed and in fact until the can is opened the liquid 9, which is now a type of broth, will remain in contact with the food article through the perforations 7 in the now shrunken envelope or bag 2 to maintain the article moist and retain its natural flavor.

While the envelope 2 has been shown as a bag closed at one end and open at the other prior to insertion of the food article, it is not necessary that one end be closed prior to insertion of the article or that the ends be sealed or closed in any particular way after the article is inserted. It is, however, preferable that both ends of the envelope be closed after the article is in place in the envelope as this assures that the envelope will not shrink or slide along the article and fail to fully support and hold it together. The fact that the ends of the envelope are closed also assists in properly shrinking the envelope 2 skinlike around the food article 3 to hold the article in its original form.

While I have shown and described certain specific embodiments of the invention, it is to be understood that I do not wish to be limited thereto, since various modifications can be made without departing from the scope of the invention as defined in the appended claims.

I claim:

1. A product of manufacture comprising a dressed fowl body of irregular shape, a sealed rigid merchandising container housing said fowl body, an edible liquid in the container surrounding said fowl body and a perforated envelope of shrinkable material tightly fitted on said fowl body so as to prevent it from breaking into parts in said liquid and allowing contact through the envelope perforations of said liquid with said fowl body.

2. A product of manufacture comprising a dressed fowl body of irregular shape, a sealed rigid merchandising container housing said fowl, an edible liquid in the container surrounding said fowl, a perforated envelope of heat shrinkable material shrunk into tightly fitted relation with said fowl body and adapted to prevent it from breaking into parts in said liquid and allowing contact through the envelope perforations of said liquid with said fowl body.

3. A method of canning which comprises placing a dressed fowl body of irregular shape in a perforated envelope of shrinkable material, drawing the envelope tight about said fowl body and securing the envelope, immersing the enveloped fowl body in an edible liquid in a rigid merchandising container, sealing the container and then heating the container to heat process the fowl body while confined by said envelope against breaking apart in the liquid and with the liquid contacting the fowl body and mixing with the natural juices exuding therefrom through the perforations in said envelope.

4. A method of canning which comprises placing a food article comprising a dressed fowl body of irregular shape into a perforated heat shrinkable envelope, inserting the envelope carrying said article into a rigid merchandising container holding an edible liquid, hermetically sealing said container, and heating the container and its contents so as to cause said envelope to shrink on the article to prevent said article from falling apart while in place in the liquid, said liquid contacting said food article through the perforations in said envelope to mix with natural juices exuding from the article to form a broth.

5. A method of canning which comprises inserting a food article comprising a dressed fowl body of irregular shape into a perforated heat shrinkable envelope, placing the envelope carrying said article into a rigid merchandising container, adding an edible liquid to the container so as to substantially fill the space around the envelope, hermetically sealing the container, and heating the container and its contents for from sixty to ninety minutes at temperatures ranging from 240 to 250 degrees Fahrenheit to kill bacteria and to cause the envelope to shrink on the article to prevent said article from falling apart while in place in the liquid, said liquid contacting said food article through the perforations in said envelope to mix with natural juices exuding from the article to form a broth.

EDWIN H. EICHLER.

References Cited in the file of this patent

UNITED STATES PATENTS

| Number | Name | Date |
|--------|------|------|
| 224,563 | Verhage | Feb. 17, 1880 |
| 1,740,176 | Hormel et al. | Dec. 17, 1929 |
| 2,366,169 | Barth | Jan. 2, 1945 |
| 2,430,818 | Kellerman | Nov. 11, 1947 |
| 2,480,082 | Lowry et al. | Aug. 23, 1949 |